March 13, 1928.                                           1,662,573
E. C. GLARDON
JOINT BINDER
Filed June 22, 1927

Inventor
Edouard Charles Glardon

Patented Mar. 13, 1928.

1,662,573

UNITED STATES PATENT OFFICE.

EDOUARD CHARLES GLARDON, OF LAUSANNE, SWITZERLAND.

JOINT BINDER.

Application filed June 22, 1927, Serial No. 200,712, and in Germany May 28, 1925.

The present invention relates to improvements connected with joint binders, such as are used for binding together wooden planks, boards and the like and especially for securing the lids or covers on chests and boxes to safeguard the contents of the latter against pilfering and fraudulent access being had thereto. More particularly the invention relates to that known class of joint binders, which consists of a U-shaped safety clamp, the perforated shanks of which are to be driven into the two parts to be secured together, and of a flat barbed nail which is driven into the said two parts and through the perforations of the shanks until its head is countersunk in one of those parts, to prevent the clamp from being withdrawn without leaving evidence that it had been tampered with.

The flat nails hitherto used in connection with joint binders of the class referred to do not afford a reliable protection against the withdrawal of the clamps, for the reason that it is possible to drive such nails completely through both shanks of the clamps, thus liberating the clamps and enabling same to be withdrawn and to be reinserted without noticeable traces.

In order to render effective the protection aimed at by the use of the aforesaid U-shaped safety clamps and the flat barbed nails in connection therewith, means must be provided by which it is rendered impossible to drive the flat barbed nails completely through both shanks of the clamps.

According to the present invention these means consists in a re-inforcement for the edge portions of the perforations of the shanks, adapted to prevent the head of the flat barbed nail, situated in these perforations, cutting its way through the edge portions even if the nail receives hard and sudden blows in the attempt to drive same completely through both shanks of the clamps.

In the annexed drawing are shown, by way of example, several modes of carrying into practice this invention.

Figure 1:
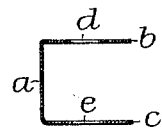
Figure 3:
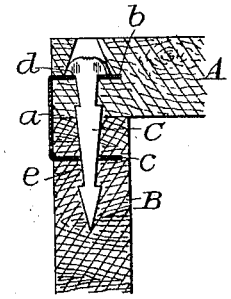
Figure 2:
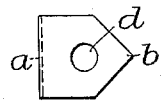
Figure 4:
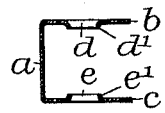
Figure 5:
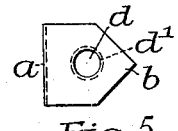

Figure 1 is a central vertical section of an ordinary U-shaped safety clamp as commonly in use, Figure 2 is a plan view of Figure 1, Figure 3 shows a joint binder of the nature described employing a U-shaped safety clamp such as indicated in Figures 1 and 2 for connecting the lid with the body of a box, Figure 4 is a central vertical section of the improved U-shaped safety clamp, Figure 5 is a plan view of Figure 4.

Figure 6:
Figure 7:
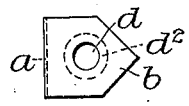
Figure 8:
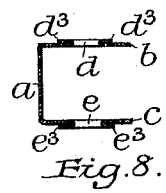
Figure 10:
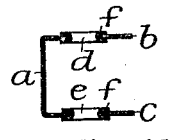
Figure 9:
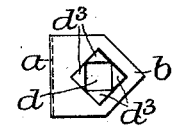
Figure 11:
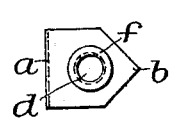

Figure 6 is a central vertical section of a modification of the improved U-shaped safety clamp, Figure 7 is a plan view of Figure 6, Figure 8 is a central vertical section of another modification of the improved U-shaped safety clamp, and Figure 9 is a plan view of Figure 8, Figure 10 is a central vertical section of another modification of the improved U-shaped safety clamp, and Figure 11 is a plan view of Figure 10.

The joint binder employs in the usual manner a U-shaped clamp consisting of two shanks $b$, $c$, which are interconnected by the web $a$ and which are each provided with a perforation $d$ and $e$ respectively. This clamp with its shanks $b$, $c$, is to be driven into the two parts A, B to be safeguarded in their connection as indicated in Figure 3 and subsequently a flat barbed nail C is to be driven into the two parts A, B so as to take up its position in the perforations of the shanks $b$, $c$, as indicated in Figure 3.

The re-inforcement for the edge portions of the perforations $d$, $e$ in the shanks $b$, $c$, may be conveniently formed by portions of the shank metal cut in forming the perforations being bent to form a ridge or flange along said edge portions. In the arrangement shown in Figures 4 and 5 the shank metal at the margins of the perforations is turned inwardly forming ridges or flanges $d^1$ and $e^1$ respectively, which extend about double the thickness of the sheet metal employed in the production of the clamp.

The modification in the re-inforcement of the edge portion of the perforations $d$, $e$ in the shanks $b$, $c$, which is illustrated in Figures 6 and 7, differs from the arrangement according to Figures 4 and 5 in that the shank metal at the edges of the perforations is completely turned into the ridge or flange, so that the edge portion of the perforations $d$, $e$, is doubled in thickness as indicated by the reference letters $d^2$ and $e^2$ respectively.

According to Figures 8 and 9 the perforations $d$, $e$ in the shanks $b$, $c$ and the re-inforcement of their edge portion are obtained by employing a punch which instead of cutting a clean hole, merely pierces the shanks $b$, $e$ at the meeting point of crossing slits. In so piercing the shanks $b$, $c$ the metal severed by the crossing slits is turned, forming triangular prongs $d^3$ and $e^3$ respectively, said prongs, by completely turning them, doubling the edge portion of the perforations $d$, $e$ similar to the bordering of the edge portion of the perforations $d$ and $e$ as shown in Figures 6 and 7.

By previously providing crossing slits in the shanks $b$, $c$ at the places where the perforations $d$, $e$ are to be situated the formation of the prongs $d^3$ and $e^3$ respectively takes place in the required arrangement, so that the flat barbed nail in being driven home into the clamp is sure to face with its lateral edges the re-inforced edge portions of the perforations $d$, $e$.

To produce the crossing slits in the shanks $b$, $c$ the punch employed in piercing the latter may be provided with radial cutting edges.

The modification in the re-inforcement of the edge portion of the perforations $d$, $e$ in the shanks $b$, $c$, which is illustrated in Figures 10 and 11 employs annular eyelets $f$ bordering the edge portion of the perforations as shown.

By re-inforcing the edge portion of the perforations in the shanks $b$, $c$ in the manner described with reference to the several figures, the ordinary flat barbed nail C, which forms an accessory part of the U-shaped clamp, the largest dimension of which, at the head portion, exceeds the diameter of the perforations, cannot cut its way through the edge portions of the perforations, so that it is impossible to completely drive the nail through both shanks of the clamp.

It is to be understood that the constructional forms illustrated in the drawings are given merely as an example, and that modifications may be made according to requirements in the construction and in the sizes of the respective parts without departing from the essential features of the invention.

Having described my invention, I declare that what I claim and desire to secure by Letters Patent is:—

1. A joint binder comprising a U-shaped clamp, the two shanks of which are perforated and adapted to enter the two members to be secured together, a flat barbed nail adapted to be driven into the said two members and through the perforations of the shanks, and a re-inforcement for the edge portions of the perforations in the shanks adapted to prevent the head of the flat barbed nail being driven through the edge portions.

2. A joint binder comprising a U-shaped clamp, the two shanks of which are perforated and adapted to enter the two members to be secured together, a flat barbed nail adapted to be driven into the said two members and through the perforations of the shanks, and a re-inforcement for the edge portions of the perforations in the shanks adapted to prevent the head of the flat barbed nail being driven through the edge portions, said re-inforcement consisting of portions of the shank metal cut in forming the perforations bent to form ridges along said edge portions.

3. A joint binder comprising a U-shaped clamp, the two shanks of which are perforated and adapted to enter the two members to be secured together, a flat barbed nail adapted to be driven into the said two members and through the perforations of the shanks, and a re-inforcement for the edge portions of the perforations in the shanks adapted to prevent the head of the flat barbed nail being driven through the edge portions, said re-inforcement consisting of bent over triangular portions of the shank metal bordering the perforations and formed by cutting crossing slits in said shank.

In testimony whereof I have affixed my signature hereto.

EDOUARD CHARLES GLARDON.